Oct. 12, 1954

R. E. RILEY 2,691,234

FISH LURE

Filed April 24, 1948

INVENTOR.
RALPH E. RILEY
BY John P. Truscott
ATTORNEY

Patented Oct. 12, 1954

2,691,234

UNITED STATES PATENT OFFICE 2,691,234

FISH LURE

Ralph E. Riley, Akron, Ohio

Application April 24, 1948, Serial No. 23,032

15 Claims. (Cl. 43—26.2)

The present invention relates to a fish lure and a primary object of this invention is to provide a lure which will move through water with a sinuous motion, preferably in a vertical plane but it is to be understood that the invention is not limited to having the lure move in a vertical plane as it is possible to have it move laterally by use of the same mechanism. In fact in practice, while the invention contemplates a lure which is so designed that normally it will maintain its upright position, nevertheless in operation the lure may cant to one side or the other and thus cause the lure to move other than in a vertical plane.

Another object of this invention is to provide a deflector which is movable so that its angular position will be changed and to provide a mechanical means for actuating the deflector.

Another object of this invention is to provide a lure in which there is a fixed deflector for normally carrying the lure downward and in which there is a movable deflector for deflecting the lure upward.

Other objects of this invention will appear herein after as the description thereof proceeds, the novel features, arrangements and combinations being clearly set forth in the specification and in the claims thereunto appended.

Figures 3, 4, 6:
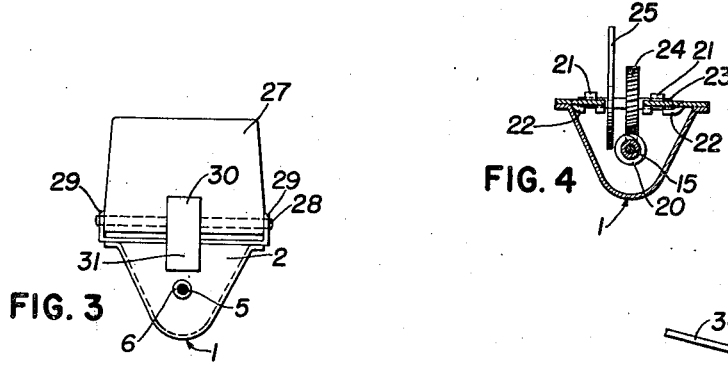
Fig. 3 is a vertical elevation of one end of the lure taken substantially along the line 3—3 of Fig. 2.
Fig. 4 is a cross section taken substantially along the line 4—4 of Fig. 2.
Fig. 6 is a fragmentary elevational view showing an alternate method of mounting the movable deflector.

In the drawings, the reference character 1 indicates generally a body portion made of sheet metal or plastic which has a cross sectional shape best illustrated in Fig. 3 with end walls 2 and 3 and a cover plate 4 formed as a separate piece as shown in the drawings and sweated or otherwise fastened to the top of the body.

The bearing shaft 5 is sweated into a bearing 6 formed on the end wall 2 and has an eye 7 to which is attached the eye of a hook 8. The bearing shaft 5 extends through the body of the lure and through an opening 9 in the wall 3. The end of the bearing shaft 5 at the left has an enlarged head 10 within a hollow connector 11 and a connecting piece 12, formed with an eye 13, also has an upset head 14 arranged within the hollow connector 11. This provides a swivel connection between the member 12 and the bearing shaft 5. The fish line is connected to the eye 13 so as to enable the lure to be pulled through the water.

Surrounding the bearing shaft 5 is a hollow shaft 15 which rotates freely on the bearing shaft 5 and within a bearing 16 on the end wall 3, which bearing is sweated onto the end wall after the hollow shaft is in place. A propeller 17 mounted on the shaft 15 causes the shaft 15 to rotate as the lure moves through the water. A collar 18 on the shaft 15 abuts against the bearing 16 and prevents the shaft 15 from moving to the left. This bearing may not be necessary because the thrust on the propeller normally drives the propeller to the right as viewed in Fig. 2. The thrust of the shaft 15 is taken up by a thrust bearing 19 surrounding the bearing shaft 5. This thrust bearing may conveniently be formed of a rather hard material, such as glass or porcelain, having little friction.

Formed on the outer surface of the shaft is a worm 20 which is formed either as an integral part of the shaft 15 or as a separate element fastened thereon. The plate 4 has portions of the upper surface thereof struck up and down as at 21 and 22, respectively, to form a bearing to receive a shaft 23, which shaft is rotatably received within the space between the portions 21 and 22. A worm wheel 24 mounted on the shaft 23 meshes with the worm 20 and is rotated thereby. A cam 25 is also mounted on the shaft 23 to move in unison with the worm wheel 24. A slot 26 in the plate 4 is formed to permit the gear and cam to project above the plane of the plate. If desired, the shaft 23 could be rigidly secured to the plate with the cam and gear connected together and rotatable on shaft 23.

A deflector 27 is pivoted at 28 to ears 29 on the plate 4 and this is normally spring pressed downward against the surface of the cam by means of a spring 30 engaging the upper surface of the deflector and fastened as at 31 to the end wall 2. Thus, as the cam rotates, the deflector will move up and down in a manner which will be well understood.

The forward or left end of the plate 4 is provided with an integral downwardly extending deflector 32 which is slotted at 33 so that the deflector will straddle the shaft 15. This is a fixed deflector which normally causes the lure to be dragged down into the water as the lure is being pulled therethrough. The deflector 27 when in the position shown in Fig. 2 will counteract the effect of the deflector 32 and cause the lure to move upward in the water and as the cam 25 rotates through 180°, the deflector assumes a more or less horizontal position which then permits the deflector 32 to control the movement of the lure.

The operation of the device should be apparent from the above description. The deflector 32 normally causes the lure to move downward in the water when the deflector 27 is in a substantially horizontal position and then as the deflector 27 is moved to the position shown in Fig. 2, the deflector 27 overcomes the action of the deflector 32 and causes the lure to rise. Thus, the lure moves through the water first downward and then upward along a sinous path. The effectiveness of the deflector 32 can be varied by bending the same along its point of juncture with the plate 4, or by changing the shape of the deflector 27.

Figure 1:
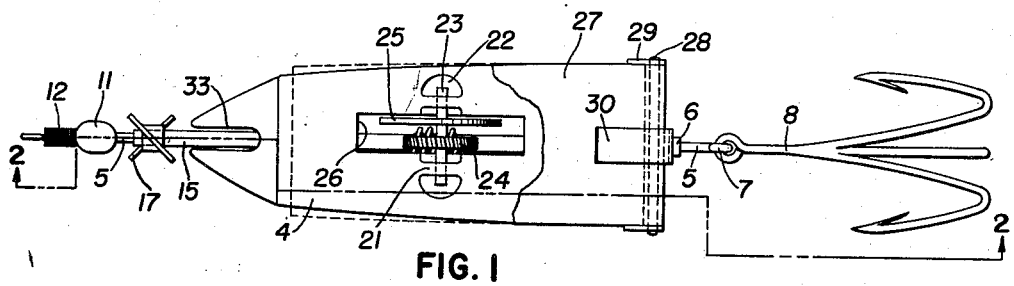
Fig. 1 represents a top plan view of a lure embodying my invention.
Figure 2:
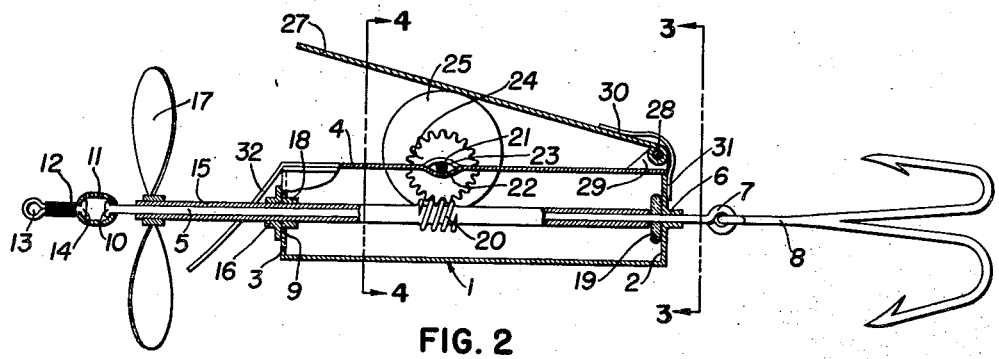
Fig. 2 is a cross section taken substantially along the line 2—2 of Fig. 1.
Figure 5:
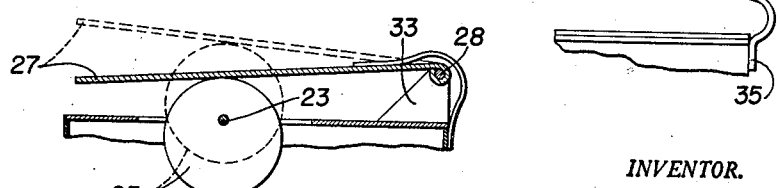
Fig. 5 is a fragmentary view similar to Fig. 2 but in elevation, showing a modification of my invention.

In Fig. 5, where the same reference characters represent similar parts in Figs. 1–4, inclusive, I have shown the top plate 4 with extending ears 33 which raise the pivot 28 of the deflector 27 higher above the surface of the plate than in Fig. 2 so that as the cam 25 rotates between the full and dotted line positions shown in Fig. 5, the deflector 27 will move from the full to the dotted line position and back again in a continuous cycle to alternately give to the deflector the property of causing a downward deflection of the lure and an upward deflection thereof. By this means, the deflector such as 32 shown in Fig. 2 can be eliminated with all of the deflection being done by the deflector 27.

In Fig. 6, I have shown a still further modification for a deflector such as 27. In this form of the invention, instead of projecting the deflector, I have provided a deflector 34 which can be used in place of the deflectors shown in the other figures with the mechanisms shown therein. This deflector 34 is made of spring metal and is connected at 35 to the end wall of the lure. Due to the resiliency of the metal, the deflector can be moved up and down by the cam means shown in the other figures, thus eliminating the special hinge connections necessary with the other constructions. The operation of the deflector is the same as in the other figures.

While I have shown the body of the lure as being made of metal, the same could be made of a hollowed out piece of wood or plastic which is hollowed only sufficiently to provide a recess for the cam and gears and is bored longitudinally to receive the propeller shaft and the bearing shaft. The body could also be streamlined and made to represent a fish or similar lure of well known type.

Also, in place of ordinary fish hooks attached to the lure, an additional lure may be connected to the lure described and the device used to actuate that additional lure.

While the cross sectional shape of the lure is not material, it is preferred to use a cross section which is substantially in the form of an inverted triangle, with the apex of the triangle rounded off. Such a construction prevents the lateral canting of the lure as it moves through the water. In making the device of wood, the forward end of the body would be extended so that it sloped substantially the same as the deflector 32 and to serve the same purpose as the deflector 32.

Other modifications of this invention can be made within the purview of the invention without departing from the spirit thereof and therefore I do not wish to be limited to the particular constructions shown in the drawing but only to the extent defined in the claims hereunto appended.

Having thus fully described my invention, what I claim and desire to secure by Letters Patent of the United States is:

1. A fishing lure comprising a body provided adjacent one end with means to which a pulling means may be attached, said body having a slot therein, a shaft mounted transversely to said body and extending through said slot, a cam mounted on said shaft to move therewith and projecting from said slot to a position outside said body, a deflector pivoted on said body adapted to be oscillated by said cam to cause a deflection of said body when said body is pulled through a body of water, a propeller, and gearing connecting said propeller and shaft to rotate the shaft when the propeller rotates.

2. A device as set forth in claim 1 in which the gearing comprises a worm actuated by said propeller and a worm wheel in engagement with the worm and connected in driving relation to said shaft.

3. A device as set forth in claim 1 in which the gearing comprises a propeller shaft on which the propeller is mounted, a worm on said propeller shaft, a worm wheel engaging said worm and in driving relation to said first shaft.

4. A device as set forth in claim 1 in which the worm wheel and cam are mounted on said first shaft to rotate therewith.

5. A fishing lure comprising a body provided adjacent one end with means to which a pulling means may be attached, a fixed deflector on said body extending downwardly and forwardly of said body to deflect said body downwardly in a body of water as the lure is pulled therethrough, a movable deflector movable to a position remote from the body for counteracting the movement of said fixed deflector in varying degrees when said movable deflector is in said remote position, and means adapted to be operated by the water as the lure moves therethrough to move said movable deflector to the aforesaid position.

6. A fishing lure comprising a body provided adjacent one end with means to which a pulling means may be attached, a fixed deflector on said body arranged at an angle to deflect the lure in one direction away from the direction of pull on said lure, and a deflector mounted for movement on said body to and from a position in which it tends to deflect the lure toward the line of pull to thus counteract the action of said fixed deflector to thus cause the body to diverge from the direction of pull to a lesser extent than it would normally under the action of said fixed deflector, and means for positively moving said movable deflector in a controlled repetitive cycle.

7. A device as set forth in claim 6 in which the moveable deflector is mounted for movement to a position where it will at least entirely overcome the action of the fixed deflector and means for urging said movable deflector toward said deflector moving means.

8. A device as set forth in claim 6 in which the moveable deflector is mounted for movement to a position where it will entirely overcome the action of the fixed deflector and an additional movement of the deflector in the same direction causes movement of said body in a direction opposite to that in which the fixed deflector tends to move said body and means for urging said movable deflector toward said deflector moving means.

9. A fishing lure comprising an elongated body having a slot therein, a first shaft extending longitudinally through said body and fixed with respect to said body and having means at the end near the head for attachment to a fish line, a hollow shaft through which said first shaft extends, said hollow shaft being adapted to rotate on said first shaft, a cam rotatably mounted in said recess, gearing connecting said hollow shaft with said cam to actuate the latter, a propeller on said hollow shaft, and an angularly movable deflector mounted on said body for angular movement and connected in actuating relationship to said cam to be moved thereby.

10. A device as set forth in claim 9 in which the deflector is moved in one direction by the cam and in which there is a resilient means resisting such movement and urging said deflector in the opposite direction.

11. A fish lure comprising an elongated body having a head and tail end, a thin broad faced deflector mounted on the body for angular movement, the free end thereof extending forwardly toward the head end of the body with the broad face thereof opposed to the adjacent outer surface of the body and being angularly movable from a position in which said free end lies close to said body, to a position away from said body at a decided angle thereto to thus cause it to move transversely to the normal movement imparted thereto by a line attached to the head thereof, and actuating means mounted wholly on said body for positively moving said deflector in a controlled repetitive cycle from one said position to the other at a relatively slow rate, and water operated means for driving said actuating means as the lure moves through a body of water.

12. A fish lure as set forth in claim 11 in which the deflector is mounted on the upper surface thereof for angular movement toward and away from said upper surface.

13. A fish lure as set forth in claim 11 in which said actuating means for the deflector comprises a cam on said body engaging the broad face of said deflector on the inside thereof, and said water operated means comprises a propeller on said body, and gearing connecting said propeller and cam to rotate the latter at a substantially reduced speed to that of the propeller.

14. A device as set forth in claim 11 in which said water operated means comprises a propeller on said body actuatable by the water as the body moves therethrough, and in which said actuating means comprises a cam mounted on said body for moving said deflector in one direction and a resilient means for urging said deflector in the opposite direction.

15. A device as set forth in claim 11 which includes a fixed deflector mounted on the head end of the body at an angle with respect to the body axis that is opposite to that occupied by said first deflector when its free end is at said second mentioned position.

References Cited in the file of this patent

UNITED STATES PATENTS

| Number | Name | Date |
| --- | --- | --- |
| 777,491 | Brown | Dec. 13, 1904 |
| 831,831 | Clippinger | Sept. 25, 1906 |
| 1,347,730 | Zeitlin | July 27, 1920 |
| 1,565,148 | Hoffman | Dec. 8, 1925 |
| 1,842,751 | Hannon | Jan. 26, 1932 |
| 1,906,791 | Grossmann | May 2, 1933 |
| 2,078,816 | Shenitz | Apr. 27, 1937 |
| 2,097,986 | McEwen | Nov. 2, 1937 |
| 2,173,540 | Rayburn | Sept. 19, 1939 |
| 2,245,061 | Wisniewski | June 10, 1941 |
| 2,313,709 | Dunkelberger | Mar. 9, 1943 |
| 2,437,523 | Hahn | Mar. 9, 1948 |
| 2,444,707 | Mather | July 6, 1948 |
| 2,464,465 | Steinhauer | Mar. 15, 1949 |